March 20, 1945. K. MAHNKE 2,372,102
ELECTRIC CONTROLLER
Filed Sept. 15, 1943 2 Sheets-Sheet 1
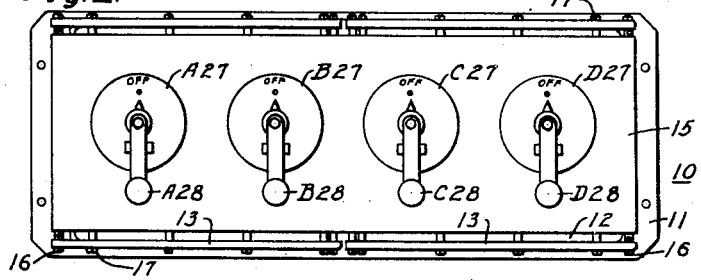
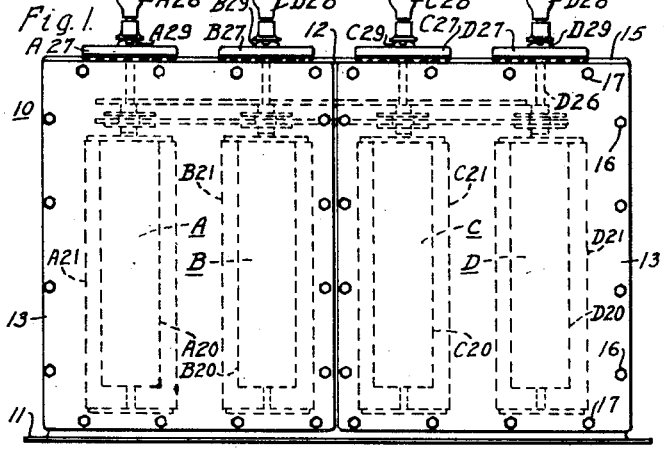
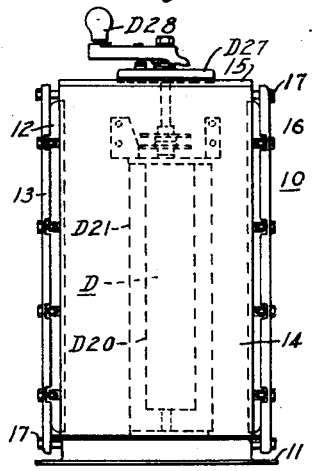
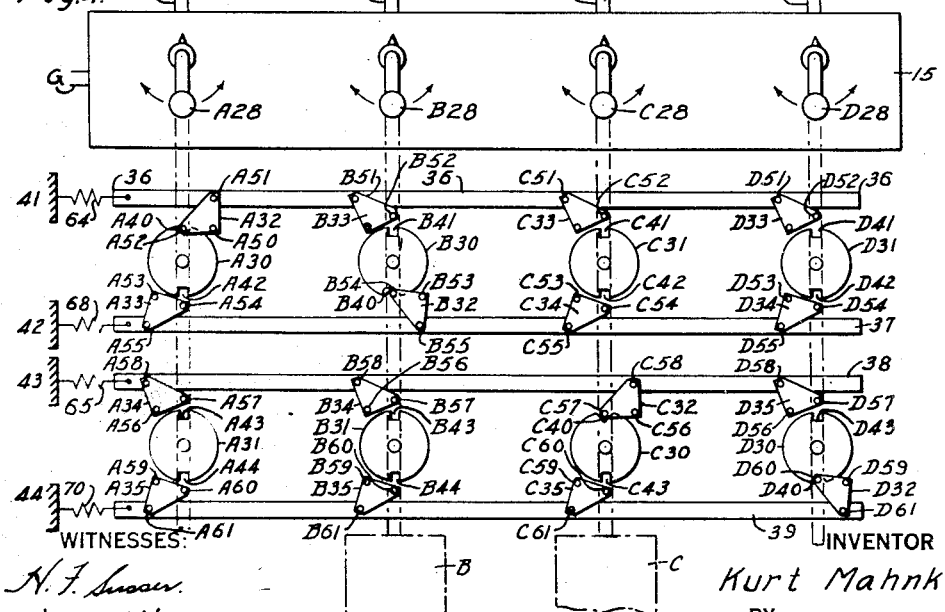
WITNESSES:
N. F. Susser
Birney Hines
INVENTOR
Kurt Mahnke.
BY
Paul E. Friedemann
ATTORNEY March 20, 1945. K. MAHNKE 2,372,102
ELECTRIC CONTROLLER
Filed Sept. 15, 1943 2 Sheets-Sheet 2
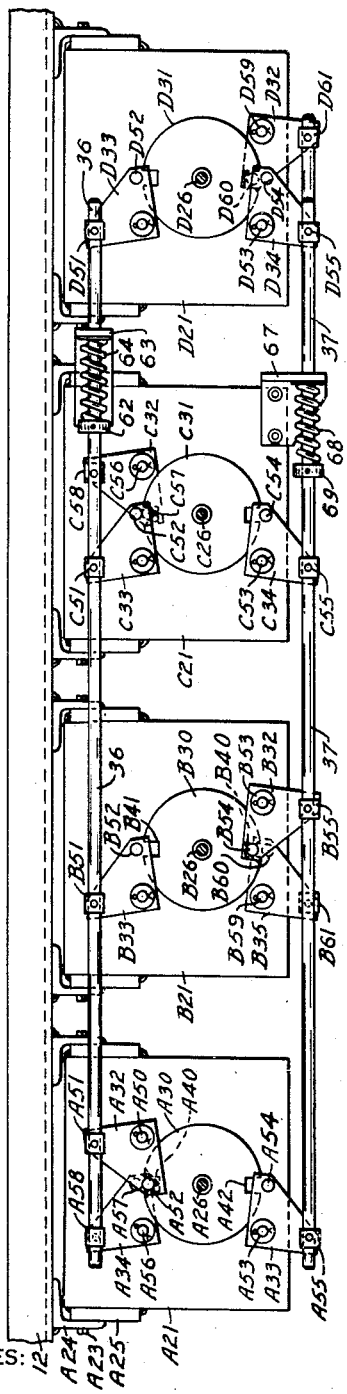
Fig. 5.
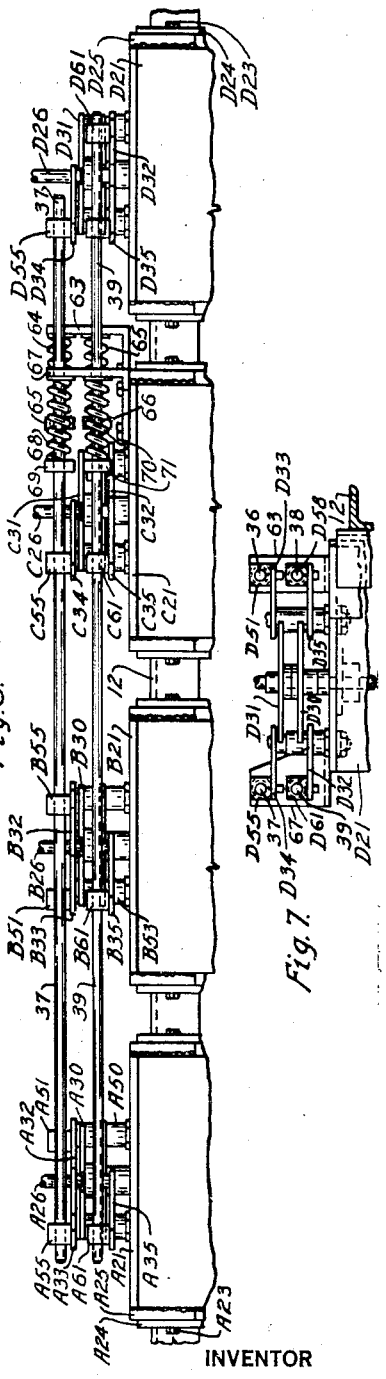
Fig. 6.
Fig. 7.
INVENTOR
Kurt Mahnke.
BY
Paul E. Friedemann
ATTORNEY Patented Mar. 20, 1945

2,372,102

UNITED STATES PATENT OFFICE 2,372,102

ELECTRIC CONTROLLER

Kurt Mahnke, Pittsburgh, Pa., assignor to Westinghouse Electric & Manufacturing Company, East Pittsburgh, Pa., a corporation of Pennsylvania Application September 15, 1943, Serial No. 502,479

4 Claims. (Cl. 200—5)

My invention relates to electric controllers and more particularly to means for interlocking a plurality of such controllers to permit the selective operation of only one or a predetermined number of them at any one time.

Some installations of electric motors for operating various pieces of apparatus are provided with a power plant or generator which is of such small size that it does not provide sufficient power to operate all of the motors simultaneously but can operate only one of the motors or a predetermined number of the motors at one time. For instance, on some ships it may be desirable to have a plurality of motors for operating various cargo hoists or winches with a power plant having a capacity suitable for only one hoist or winch. Such systems usually require suitable switches for selecting the motor to be operated and a plurality of individual controllers for controlling the motor after it is selected for operation.

One object of my invention is to provide an individual controller for each motor and to so interlock the controllers that only one may be operated at any one time with the other controllers locked against operation while the selected motor is in operation.

Another object is to provide an interlocking control system for a group of motors which will reduce the amount of switching apparatus heretofore necessary for selectively connecting only one of the motors or a predetermined number of the motors to a generator while preventing the remaining motors from being simultaneously connected thereto.

A further object is to provide an interlocking mechanism for a plurality of electric controllers which shall be simple and inexpensive to manufacture, install, operate and maintain in operation.

For a better understanding of my invention reference may be had to the accompanying drawings, in which:

Figure 1 is a view in front elevation of a control unit embodying a plurality of controllers provided with my improved interlocking mechanism;

Fig. 2 is a top plan view of the control unit illustrated in Fig. 1;

Fig. 3 is a view in end elevation of the control unit illustrated in Fig. 1;

Fig. 4 is a diagrammatic illustration of the interlocking mechanism mounted on the controllers embodied in Fig. 1;

Fig. 5 is an enlarged top plan view of the interlocking mechanism attached to the controllers;

Fig. 6 is a view in side elevation of the mechanism illustrated in Fig. 5; and,

Fig. 7 is a view in end elevation of the mechanism illustrated in Fig. 5.

Referring more particularly to the drawings, 1 have illustrated a control unit comprising a plurality of controllers A, B, C and D mounted in a suitable casing 10 for individually connecting, disconnecting and controlling a plurality of motors represented by the leads AM, BM, CM and DM and associated with a generator represented by leads G in Fig. 4. The casing comprises a bedplate 11 upon which are mounted, by means of an angle iron frame 12, a plurality of side panels or doors 13, a pair of end panels 14 and a top plate 15. The end panels and top plate may be welded to the frame and the side door panels may be mounted on the frame by means of a plurality of hinge bolts 16 and be firmly secured in position by a plurality of fastening bolts 17.

The controller A may be of any suitable type such as the so-called drum type comprising a drum A20 fixed on a shaft A26 rotatably mounted in a sutiable casing or frame A21 (Figs. 5 and 6). The controller may be removably secured to the frame 12 of the control unit by means of a plurality of bolts A23 which pass through angle irons A24 welded to the frame 12 and into stiffening blocks A25 welded to the casing of the controller. The shaft A26 extends upwardly through the top plate 15 of the controller unit and through a face plate A27 thereon and is provided with a handle A28 by means of which it may be rotated to rotate the controller drum (Figs. 1, 2 and 3).

A friction device A29 is mounted on the face plate A27 to engage the controller handle A28 and frictionally retain it in its "off" position when it is not in use. The control drum may be provided with any suitable contacts (not shown) for controlling the energization of the motor AM by the generator G, in any old and well known manner.

The controllers B, C and D are similar to the controller A and are mounted side by side in the control unit 10 in the same manner. Although I have illustrated a control unit as embodying four controllers, it is to be understood that the system may embody two, three, four or more controllers.

My improved interlocking mechanism for preventing the simultaneous operation of more than one or a predetermined number of the controllers comprises a plurality of cams or cam plates A30, B30, C30 and D30; a plurality of locking devices or locking plates A31, B31, C31 and D31; a plurality of cam operated bell crank levers A32, B32, C32 and D32; a plurality of locking bell crank levers A33, A34, A35, B33, B34, B35, C33, C34, C35, D33, D34 and D35, and a plurality of locking rods 36, 37, 38 and 39.

The cam plate A30 and the locking plate A31 are fixed on the shaft A26, with the cam plate above the plate A31; the cam B30 and the plate B31 are fixed on the shaft B26 with the cam plate B30 above the plate B31; the cam plate C30 and the locking plate C31 are fixed on the shaft C26, with the plate C31 above the cam C30; the cam D30 and the locking plate D31 are fixed on the shaft D26, with the plate D31 above the cam plate D30, so that rotation of any control shaft will rotate the cam and the locking plate thereon along with the shaft.

The cam plate A30 is provided with a cam face having a notch A40 and a locking slot A42. The cam plate B30 is provided with a cam slot B40 and a locking slot B41. The cam plate C30 is provided with a cam slot C40 and a locking slot C43. The cam plate D30 is provided with a cam slot D40 and a locking slot D43. Each of the locking plates A31, B31, C31 and D31 is provided with a pair of oppositely disposed locking slots such as A43 and A44 in cam locking plate A31; B43 and B44 in plate B31; C41 and C42 in plate C31; D41 and D42 in plate D31. The locking slot portions of the cams and plates comprise a locking means on each of the controllers for each of the other controllers.

The cam operating bell crank lever A32 is pivotally supported on a fulcrum pin A50 fixed in the top of the control casing A21, with its one arm extending to and pivotally connected with the operating rod 36 by means of a pivot block A51 and with its other arm extended to and provided with a stud or roller pin A52 for engaging the cam A30. The locking bell crank lever A33 is pivotally supported on a fulcrum pin A53 fixed in the top of the controller casing A21 with its one arm extending to and provided with a pin A54 for engaging the locking slot A42 and with its other arm extending to and pivotally connected to the operating rod 37 by means of a pivot block A55.

The locking lever A34 is pivotally supported on a fulcrum pin A56 fixed in the controller casing A21 with its one arm extending to and provided with a pin A57 for engaging the cam A31 and with its other arm extending to and pivotally connected with the operating rod 38 by a pivot block A58. The locking lever A35 is pivotally supported on a fulcrum pin A59 fixed in the controller casing A21 with its one arm extending to and provided with a pin A60 for engaging the locking slot A44 in the plate A31 and with its other arm extending to and pivotally connected with the operating rod 39 by means of a pivot block A61. The remaining cam operated bell crank levers are mounted on the remaining controller casing B21, C21 and D21 and connected with the operating rods and the cams and the locking slots in the manner just described in connection with the controller A and its locking rod 36.

The operating rod 36 rests upon and is supported by the pivot blocks A51, B51, C51 and D51 and is slidably disposed in the vertical portion of a bracket 63 mounted on the top of the casing C21. A coiled compression spring 64 is concentrically mounted on the rod 36 between the bracket 63 and a block 62 adjustably disposed on the rod. The spring 64 is provided for biasing the rod 36 toward its unlocking position. The rod 38 is mounted and supported in a similar manner on the pivot blocks A58, B58, C58 and D58 and is also slidably disposed in the bracket 63 and provided with a biasing spring 65 and an adjustable block 66 to bias it toward its unlocking position.

The operating rod 37 is mounted and supported on the pivot blocks A55, B55, C55 and D55 and is slidably disposed in the vertical portion of a bracket 67 fixed on the top of the controller casing C21. A coiled compression spring 68 is concentrically mounted on the rod 37 between the bracket 67 and a block 69 adjustably mounted on the rod for the purpose of biasing the rod toward its unlocking position. The operating rod 39 is mounted and supported in a similar manner on the pivot blocks A61, B61, C61 and D61 and is also slidably disposed in the bracket 67 and provided with a biasing spring 70 and an adjustable block 71 so that it will be biased toward its unlocking position at the left. In Fig. 4 the biasing springs 64, etc., are diagrammatically illustrated as attached to fixed points 41, 42, 43 and 44. The biasing springs are provided for the purpose of keeping the cam pins on the cam operated bell crank levers A32, B32, C32 and D32 and in the cam notches A40, B40, C40 and D40 and keeping the locking pins B50, etc., out of the locking slots B41, etc., when the controllers are in their "off" positions.

In an assumed operation of the controller interlocking mechanism, the handle A28 of the controller A will be operated in a clockwise direction to its "on" position for the purpose of connecting the motor represented by the leads AM to the generator G. The movement of the controller handle A28 rotates the controller shaft A26 in clockwise direction and thereby rotates the cam plate A30 and the locking plate A31 in the same direction. As the cam plate A30 starts its rotation, its cam shape at the notch A40 forces the cam pin A52 out of the notch and thus moves the lever A32 on its fulcrum pin A50. This movement of the lever A32 causes its outer arm engaging the pin block A51 to push the operating rod 36 to the right against the pressure of its biasing spring 64. The movement of the rod 36 to the right operates the locking bell crank levers B33, C33 and D33 to move their locking pins into the locking slots B41, C41 and D41 and thereby lock the controllers B, C and D against movement from their "off" positions until the controller A is returned to its "off" position.

After the motor associated with the controller A has operated as desired, it will be assumed that the attendant desires to shut down that motor and start some other motor and, therefore, rotates the handle A28 in counterclockwise direction to the "off" position. This rotation of the handle A28 returns the shaft A26 to its "off" position to disconnect the motor represented by the leads AM from the generator G and thereby rotates the cam A30 in counterclockwise direction until the cam pin A52 slides into the cam notch A40, thus permitting the compression spring 64 to move the rod 36 to the left. This movement of the rod 36 operates the locking levers B33, C33 and D33 to remove their locking pins B52, C52 and D52 from the locking slots B41, C41 and D41 so that any one of the controllers may now be operated to connect its motor to the generator.

Assuming now that the controller B is moved to its "on" position and that this movement of the controller handle B28 rotates the cam B30 so that its cam face forces the cam pin B54 out of the cam slot B40 and thereby rotates the lever B32 on its fulcrum pin B53 and thus, by means of the pivot block B55, moves the operating rod 37 to the right against the force of the spring 68. This movement of the operating rod 37 rotates the locking levers A33, C34 and D34 on their fulcrum pins so that their locking pins A54, C54 and D54 enter the locking slots A42, C42 and D42 in the cam plate A30 and the locking plate C31 and D31, thereby lock the controllers A, C and D against operation until the controller C is returned to its "off" position.

It will be assumed now that the controller C is returned to its "off" position and that the attendant rotates the handle C28 of the controller C to its "on" position. This movement of the controller handle C28 rotates the shaft C26 and with it the cam plate C30. The rotation of the cam C30 forces the pin C57 out of the cam slot C40 thus rotating the lever C32 on its fulcrum pin C56 and thereby operates the rod 38 by means of the pivot block C58 to the right against its compression spring 65. This movement of the rod 38 rotates the locking levers A34, B34 and D35 on their fulcrum pins so as to force their locking pins A57, B57 and D57 into the locking slots A43, B43 and D43, thereby locking the controllers A, B and D against operation as long as the controller C is in operation.

It will be assumed now that the attendant returns the controller C to its "off" position and moves the controller D to its "on" position. This operation of the controller D rotates its cam plate D30 so that its cam shaped edge forces the cam pin D60 out of the cam slot D40 and thereby rotates the cam operated lever D32 on its fulcrum pin so that it forces the pivot block D61 and the operating rod 39 to the right. This movement of the operating rod rotates the locking levers A35, B35 and C35 to move their locking pins into the locking slots A44, B44 and C44 and thereby lock the controllers A, B and C against operation while the controller D is in its "on" position.

In connection with some installations, it may be desirable to add a second generator to enable the attendant to control two motors simultaneously instead of only one motor at a time. In order to permit the simultaneous operation of two motors and yet prevent the operation of the other motors at the same time, the interlocking mechanism just described may be changed by removing some of the locking pins so that the motors and controllers will be divided into two groups.

If, for instance, drums A and B are to be operated simultaneously and drums C and D are likewise to be operated simultaneously when drums C and D are not in operation, then drums A and C may connect their motors selectively to one generator and drums B and D connect their motors to the second generator. This will require that A and C are mutually interlocked and that also B and D are interlocked with each other.

This interlocking characteristic may be secured by retaining on the rod 36, besides the roller, only the stop pin which is to be moved by turning drum A30, that is C52; on rod 37, only D54 is to be retained; on rod 38, only A57 is to be retained and on rod 39, only B60 is to be retained. In other words, the locking pins B52, D52, A54, C54, B57, D57, A60 and C60 are to be removed.

By the foregoing description it will be observed that I have provided a simple and efficient interlocking mechanism for preventing the operation of more than a predetermined number of controllers in a group of controllers at any one time.

Although I have illustrated and described only one embodiment of my invention and a modification thereof, it is to be understood that many modifications and changes therein may be made without departing from the spirit and scope of the invention.

I claim as my invention:

1. In a control unit for selectively connecting and disconnecting any one of a plurality of motors with a source of power, a controller for each motor, a shaft for each controller, a locking means on each of the controllers for each of the other controllers, a locking lever pivotally mounted on each controller for each locking means thereon, a locking rod for each controller disposed to operate one of the locking levers for each of the other controllers, means mounted on each controller and responsive to an "on" operation of that controller for moving its locking rod into position to operate the locking levers associated with it into locking position, and means for biasing the locking rods toward their unlocking position.

2. A control apparatus for a plurality of motors, comprising a controller for each motor, a cam and a locking plate mounted on the shaft of each controller, each cam being provided with a locking and interlocking cam face and a locking slot and each locking plate being provided with a plurality of locking slots, a cam lever pivotally mounted on each controller in position to be controlled by the cam thereon, a plurality of locking levers pivotally mounted on each controller in position to serve the locking slots in the cam and the locking plate on that controller, an operating rod for each controller, each rod being pivotally connected to the cam lever on its controller and to the locking lever for its controller on each of the other controllers, and means for biasing each of the rods to hold its associated cam lever against the face of its cam whereby movement of a controller from its "off" position will turn its cam to move its operating rod to force the locking levers with which it is connected into the locking slots on the locking plates of the other controllers and thus lock the other controllers against movement while its controller is in operation.

3. A control apparatus for a plurality of motors, comprising a controller for each motor, a cam plate and a locking plate mounted on the shaft of each controller, each cam plate being provided with a cam notch and a locking slot and each locking plate being provided with a plurality of locking slots, a cam lever pivotally mounted on each controller and having an inner arm and an outer arm, a plurality of locking levers pivotally mounted on each controller, one for each of the other controllers, with their inner ends extending toward the locking slots in the cam plate and the locking plate on that controller, an operating rod for each controller, each rod being pivotally connected to the outer end of the cam lever on its controller and on the outer end of a locking lever on each of the other controllers, and a spring for each shaft for biasing that shaft to move its associated cam lever against its cam plate and its locking levers out of the locking slots in the locking plates on the other controllers whereby movement of a controller from its "off" position will rotate its cam plate to force the inner end of its cam lever outwardly and thereby move its operating rod to force the locking levers with which it is connected into the locking slots on the locking plates of the other controllers and thus lock the other controllers against movement while its controller is in operation.

4. In a control unit for electric motors, a plurality of controllers, a locking rod associated with each controller, a cam fixed on each controller and disposed to operate the locking rod associated with that controller when it is moved to its "on" position, a locking device on each controller, and locking levers disposed between the locking rods and the locking devices whereby the movement of a predetermined number of controllers to their "on" position operates the locking devices of the other controllers to prevent their operation during the operation of said predetermined number of controllers.

KURT MAHNKE.